US008103258B2

(12) United States Patent
Hwang et al.

(10) Patent No.: US 8,103,258 B2
(45) Date of Patent: Jan. 24, 2012

(54) METHOD FOR CONNECTING TO NETWORK SERVER, TERMINAL USING THE SAME, AND METHOD FOR STORING INFORMATION USING BROADCAST

(75) Inventors: Su Yeon Hwang, Gwangmyeong-si (KR); Jin Sun Shim, Bucheon-si (KR); Jin Hyung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 939 days.

(21) Appl. No.: 11/806,021

(22) Filed: May 29, 2007

(65) Prior Publication Data

US 2008/0248787 A1    Oct. 9, 2008

(30) Foreign Application Priority Data

Apr. 3, 2007  (KR) .................. 10-2007-0032706

(51) Int. Cl.
*H04M 3/42* (2006.01)
(52) U.S. Cl. .................. 455/414.2; 455/403; 455/414.1; 455/414.3; 455/566
(58) Field of Classification Search ............... 455/414.1, 455/414.2, 414.3, 414.4, 566, 526
See application file for complete search history.

(56) References Cited

U.S. PATENT DOCUMENTS

| 2003/0051252 A1 | 3/2003 | Miyaoku et al. |
| 2006/0010471 A1 | 1/2006 | Zigmond |
| 2006/0194536 A1* | 8/2006 | Kim et al. ............ 455/3.02 |

FOREIGN PATENT DOCUMENTS

| CN | 1738419 A * | 2/2006 |
| WO | WO 2005/029453 A2 | 3/2005 |

* cited by examiner

*Primary Examiner* — Kamran Afshar
*Assistant Examiner* — Manpreet Matharu
(74) *Attorney, Agent, or Firm* — Birch, Stewart, Kolasch & Birch, LLP

(57) ABSTRACT

A broadcasting mobile terminal communication method and the broadcasting mobile terminal are disclosed. The method includes displaying a list of broadcast files stored on the terminal, in which at least one of the broadcast files is associated with broadcast related data stored on the terminal, and the broadcasting related data allows a user to obtain additional information about the at least one broadcast file. The method also includes selecting a broadcast file that is associated with broadcast related data, and connecting to an entity that provides the additional information about the at least one broadcast file.

23 Claims, 17 Drawing Sheets

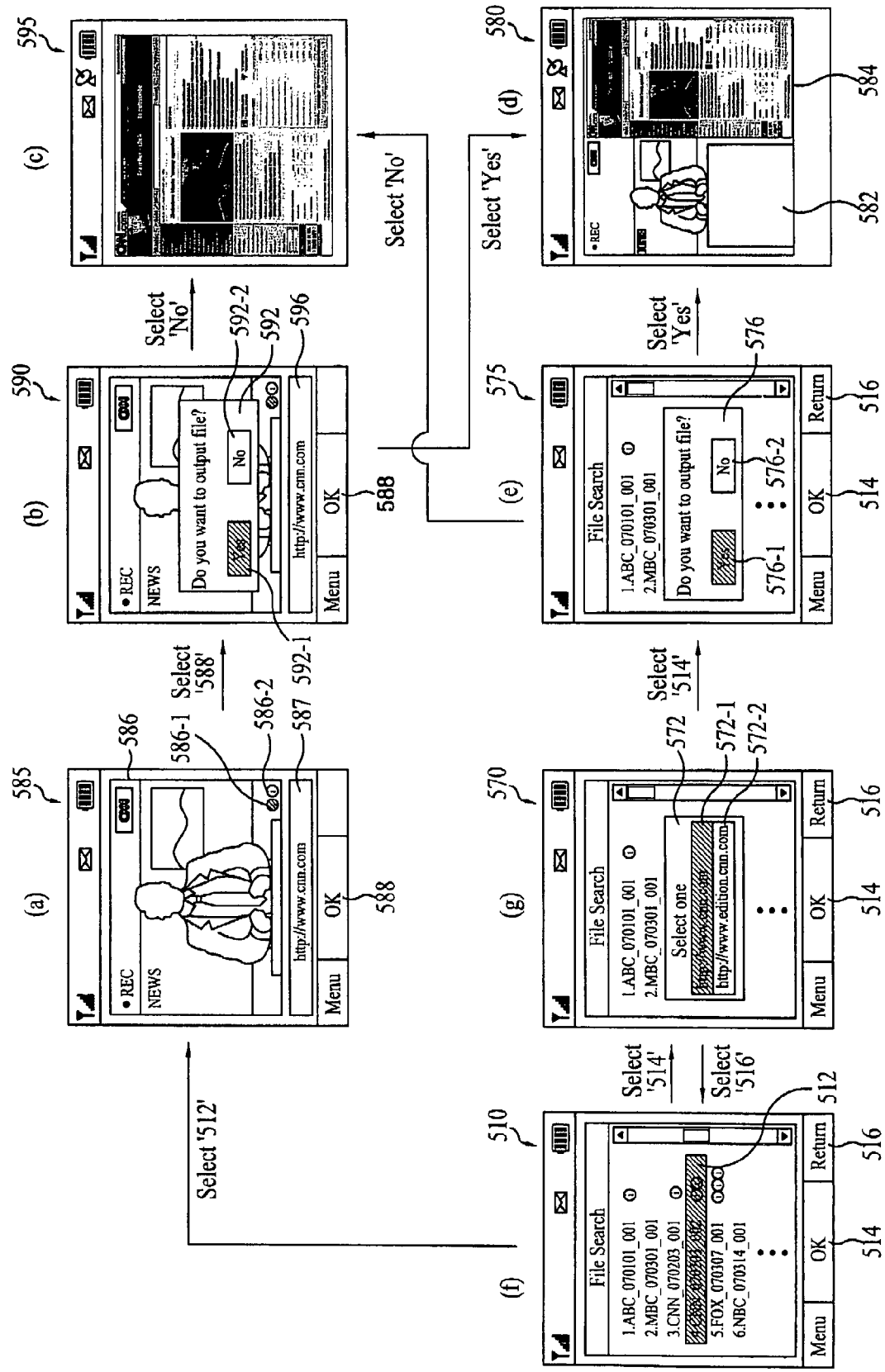

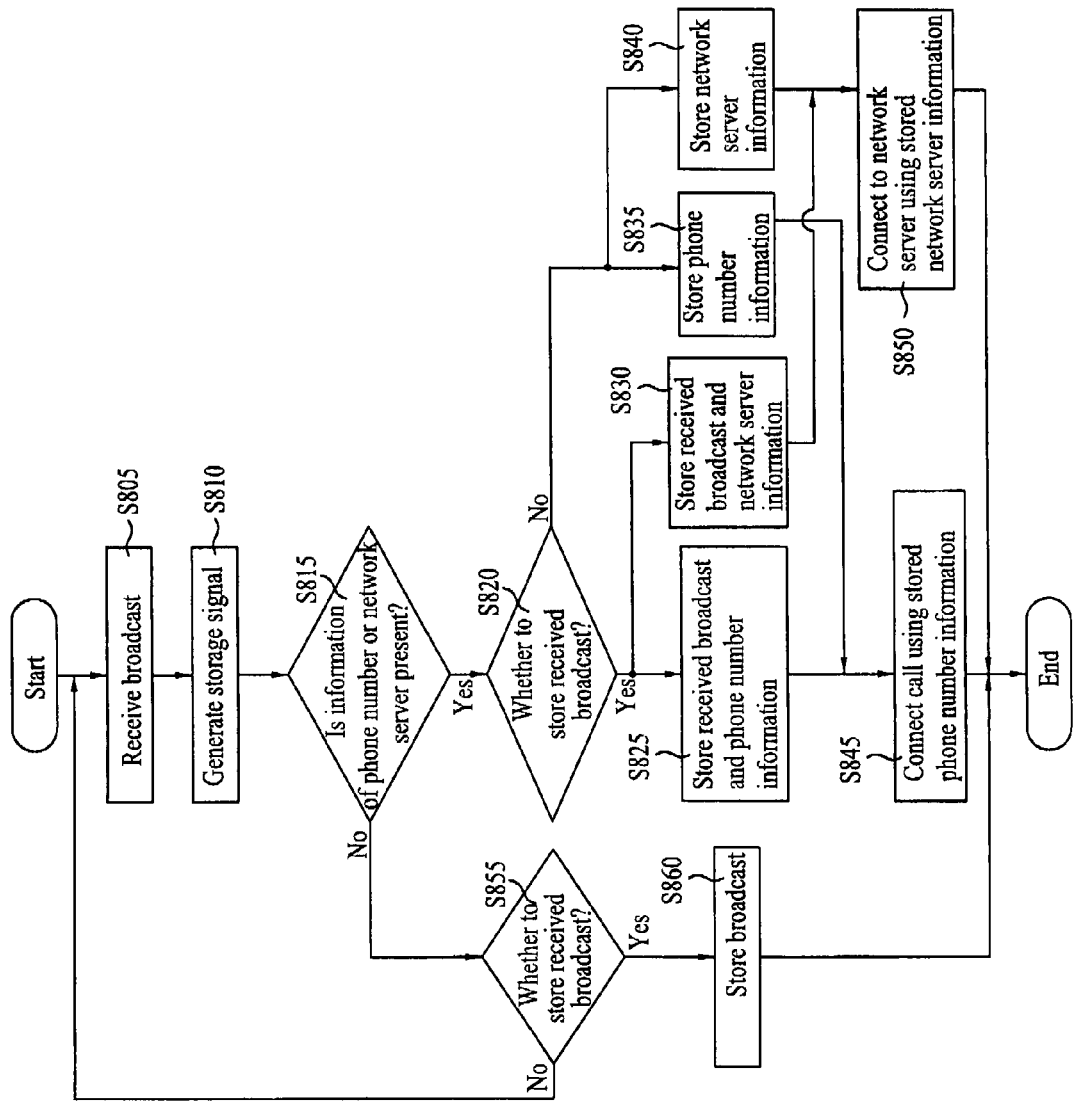

METHOD FOR CONNECTING TO NETWORK SERVER, TERMINAL USING THE SAME, AND METHOD FOR STORING INFORMATION USING BROADCAST

This application claims the benefit of Korean Patent Application No. 10-2007-0032706, filed on Apr. 3, 2007, which is hereby incorporated by reference in its entirety.

BACKGROUND OF THE INVENTION

1. Field of the Invention

The present invention relates to a method and corresponding broadcast terminal that allows a user to easily obtain additional information about a stored broadcast file.

2. Discussion of the Related Art

Many current mobile terminals are configured to receive broadcast programs from a variety of different broadcast servers. Thus, the user of a broadcast terminal can view a variety of different broadcast programs such as sporting events, news broadcasts, movies, television shows, etc. The user can also store a broadcast program for later viewing. However, when the user stores a plurality of different broadcast programs, it is difficult for the user to determine where a particular broadcast was first transmitted from.

SUMMARY OF THE INVENTION

Accordingly, one object of the present invention is to address the above-noted and other objects.

Another object of the present invention is to provide a method and corresponding terminal that allows a user to easily obtain additional information about a stored broadcast file.

To achieve these objects and other advantages and in accordance with the purpose of the invention, as embodied and broadly described herein, the present invention provides a broadcasting mobile terminal communication method. The method includes displaying a list of broadcast files stored on the terminal, in which at least one of the broadcast files is associated with broadcast related data stored on the terminal, and the broadcast related data allows a user to obtain additional information about the at least one broadcast file. The method also includes selecting a broadcast file that is associated with broadcast related data, and connecting to an entity that provides the additional information about the at least one broadcast file. The present invention also provides a corresponding broadcasting terminal.

In another aspect, the present invention provides a broadcasting mobile terminal communication method. The method includes displaying a list of broadcast related data stored on the terminal, in which the broadcast related data allows a user to obtain additional information about a corresponding broadcast file. The method also includes selecting a broadcast related data from the list of broadcast related data, and connecting to an entity that provides the additional information about the corresponding broadcast file. The present invention also provides a corresponding broadcasting terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5B is a second screenshot diagram illustrating a procedure for connecting to a network server associated with a selected file according to an embodiment of the present invention;

FIG. 8 is a flowchart illustrating a method of storing information for a broadcast file according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
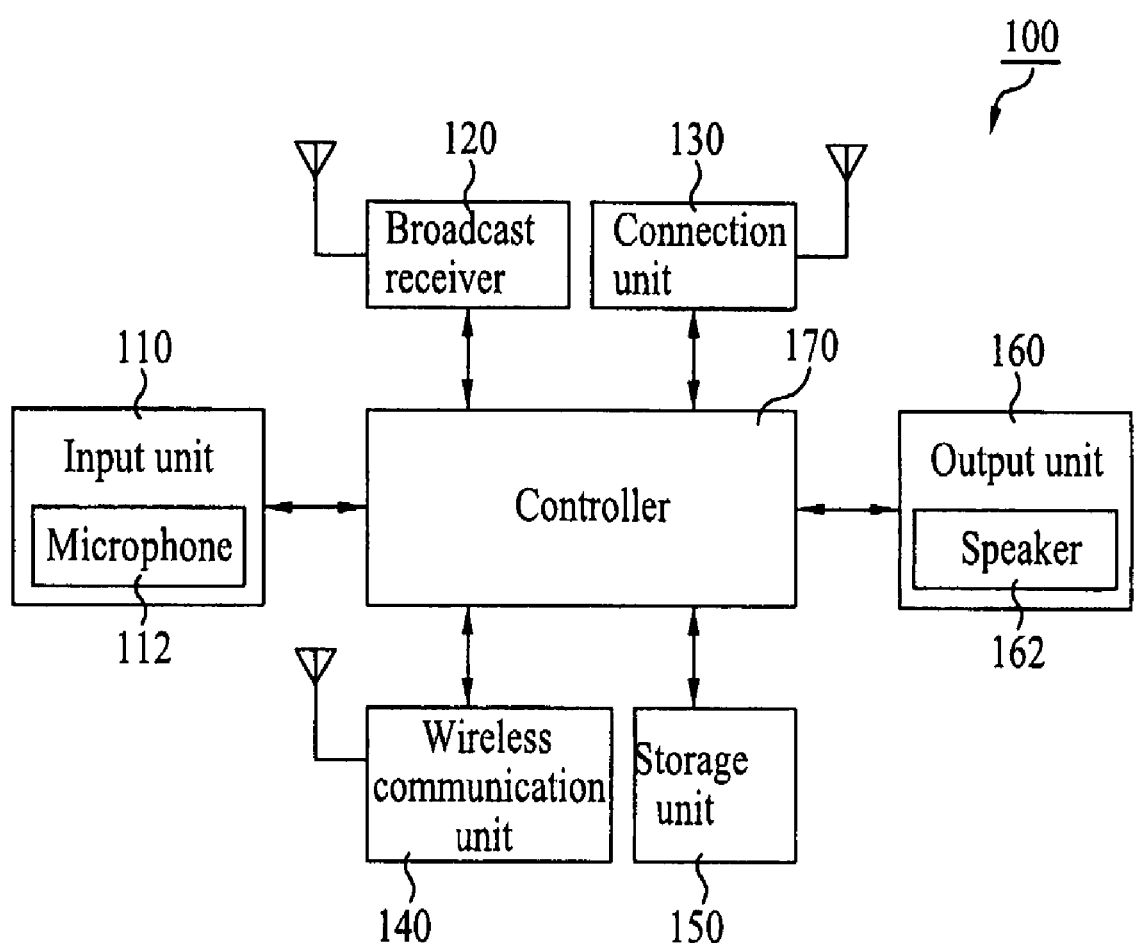
FIG. 1 is a block diagram of a broadcast terminal according to an embodiment of the present invention.

Turning first to FIG. 1, which is a block diagram of a broadcast terminal 100 according to an embodiment of the present invention. As shown, the broadcast terminal 100 includes an input unit 110, a broadcast receiver 120, a connection unit 130, a wireless communication unit 140, a storage unit 150, an output unit 160, and a controller 170.

Further, the input unit 110 includes a microphone 112 that receives an external audio signal. The output unit 160 is also divided into a video output unit (not shown) and an audio output unit (not shown). Further, as shown in FIG. 1, the output unit 160 also includes a speaker 162 as an example of the audio output unit.

The input unit 110 receives an input operation from the user of the terminal 100 and generates a corresponding signal. In addition, the broadcast receiver 120 receives broadcasts through a broadcast channel. In more detail, the broadcasts include at least one of a radio broadcast, a TV broadcast, and a data broadcast, and any combination of the data broadcast with the radio or TV broadcast.

Further, the connection unit 130 connects the terminal 100 to an external network server to thereby transmit and receive data to and from the connected network server. Also, the connection unit 130 connects to a desired network server using address information of the network server. For example, the network server address information includes information indicating the position of the network server on the network, such as a Uniform Resource Locator (URL).

In addition, the wireless communication unit 140 transmits and receives a wireless signal to and from an external terminal or server through a wireless communication network. The storage unit 150 stores the programs user for operating the terminal 100 and data input to and output from the terminal 100.

In addition, the storage unit 150 also stores a broadcast received through the broadcast receiver 130 as a broadcast file. Further, the output unit 160 outputs not only status information of the terminal 100, but also a variety of information associated with the terminal 100. Also, according to an embodiment of the present invention, the storage unit 150 stores additional information corresponding to a network server or a phone number associated with the stored broadcast file.

In addition, the additional information corresponding to the phone number includes the actual phone number, a person or company name having the phone number, services that can be provided through the phone number, etc. The network server information includes the address information of the network server, a name of the network server, services that can be provided through the network server, etc. That is, the additional information corresponds to any entity that provides the additional information.

Further, the additional information can be provided to the terminal 100 in the data that constitutes the broadcast, in data that is associated with the broadcast, in conjunction with the broadcast, etc. That is, the additional information is also provided in a separate field from the broadcast, for example.

In addition, the output unit 160 displays a list of at least one broadcast file stored in the storage unit 150 on a screen. Also, the output unit 160 may distinctly display a file having at least one associated network server (or phone number, etc.) among the at least one file in the list. Further, when a displayed file is selected, the connection unit 130 connects to at least one network server associated with the selected file according to a control signal of the controller 170.

In addition, the controller 170 can connect to an associated network server while the selected file is output and displayed or when the user requests the controller 170 connect to the associated network server. Further, the controller 170 can output the selected file and data provided from the connected network server in different display areas on one screen or output only the data provided from the connected network server according to a selection by the user.

In addition, the controller 170 connects a call through the wireless communication unit 140 using information such as the phone number stored in the storage unit 150. Also, the controller 170 can connect the call while outputting the file or when instructed by the user.

Further, the wireless communication unit 140 can also transmit a list of at least one stored broadcast file to another terminal or server and can receive a list of at least one broadcast file from an external terminal or server. Also, a file having at least one associated network server or phone number can be displayed distinctly in the list transmitted and received. Accordingly, the controller 170 can store the received list in the storage unit 150, output a file selected from the received list through the output unit 160, connect to a network server associated with a file selected from the received list through the connection unit 130, or connect a call to a phone number associated with a file selected from the received list through the wireless communication unit 140.

A method for connecting to a network server according to an embodiment of the present invention will now be described in detail with reference to the flowchart in FIG. 2.

Figure 2:
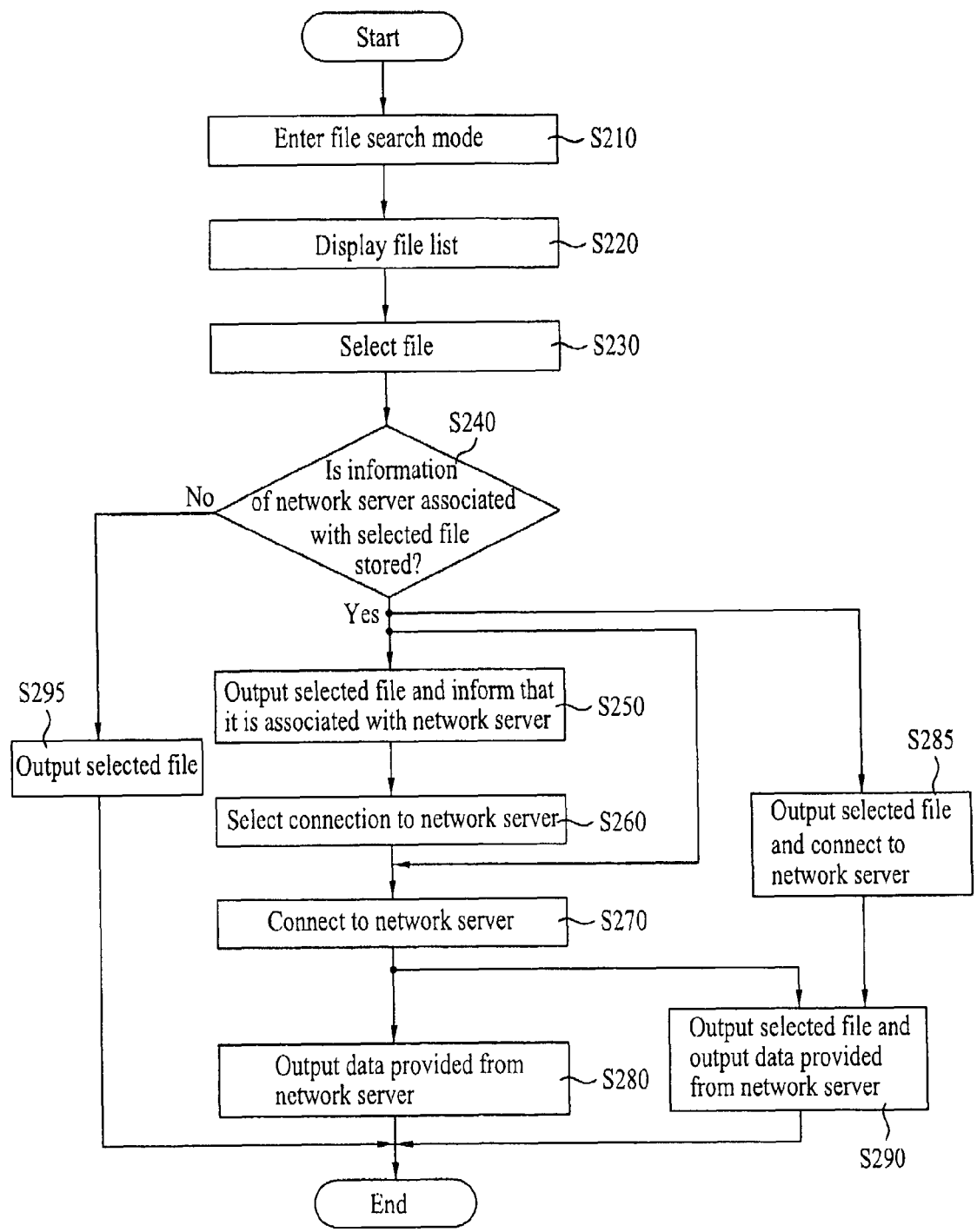
FIG. 2 is a flowchart illustrating a method for providing additional information about a stored broadcast file according to an embodiment of the present invention.

As shown in FIG. 2, the user of the terminal 100 enters a file search mode (S210). That is, the file search mode searches for at least one stored broadcast file. Alternatively, the file search mode may search for at least one network server associated with a stored broadcast file.

In addition, the stored broadcast file may include video data, audio data, and multimedia data. More specifically, the video data includes, for example, a plurality of images, the audio data includes an audio signal, and the multimedia data includes images and audio signals synchronized with the images.

Then, when the file search mode is entered, the terminal 100 displays the list of at least one broadcast file (S220).

Hereinafter, it is assumed the file list includes a plurality of broadcast files and will be referred to as a "file list". However, the file list may include only one broadcast file. In addition, rather than displaying a list of stored broadcast files, the mobile terminal 100 may display a list of network servers associated with the stored broadcast files. In this instance, the list of files will be referred to as a "network server list."

Figure 3A:
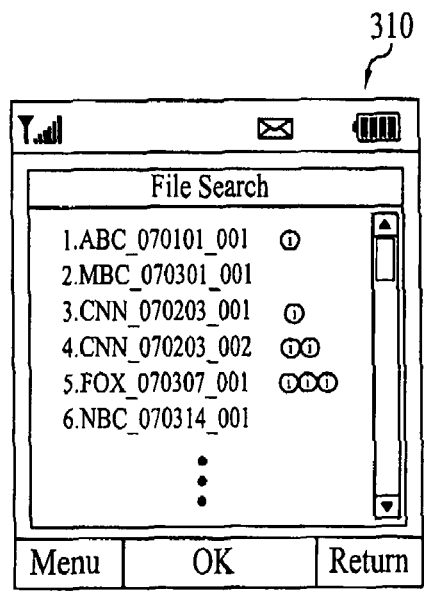
FIG. 3A is a first screenshot illustrating a list of broadcast files some of which include an associated indicator indicating additional information is available according to an embodiment of the present invention.

In more detail, FIGS. 3A to 3H illustrates the differences between displaying the network file list including a list of network servers associated with the stored broadcast files, and displaying the file list including a list of stored broadcast files. For example, as shown in FIG. 3A, the terminal 100 displays a screen 310 including a file name of each stored broadcast file. In addition, some of the stored broadcast files include an indicator (shown as a small "i") indicating to the user the presence of the associated network server.

Further, in FIG. 3A, a number of the displayed indicators is equal to a number of network servers associated with the file. Therefore, if there are three indicators displayed for a particular file, the user can readily determine that there are three network servers associated with the particular file. Alternatively, it is possible to display only one indicator for a stored broadcast file, regardless of the number of network servers associated with the file.

Figure 3B:
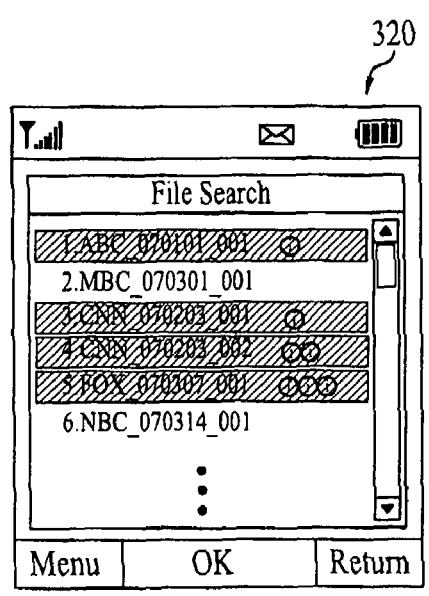
FIG. 3B is a second screenshot illustrating the broadcast files that include the associated indicator being visually distinguished from broadcast files that do not include an associated indicator according to an embodiment of the present invention.

Further, in the example shown in FIG. 3B, in addition to displaying the indicators as shown in FIG. 3A, the terminal 100 also displays a screen 320 in which a background color of each file name having an associated indicator is distinguished from a background color of file names of files not having an indicator (and thus not having an associated network server).

Figure 3C:
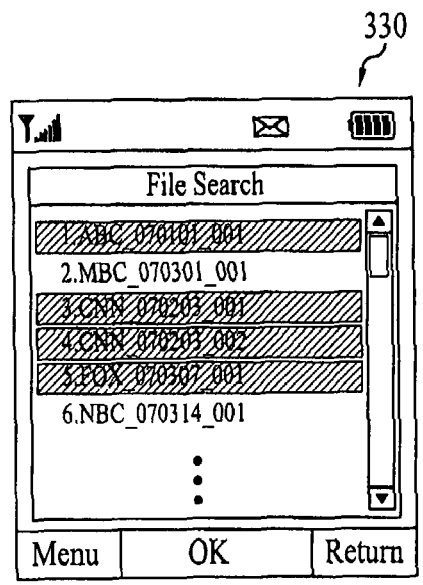
FIG. 3C is a third screen shot illustrating the broadcast files that include additional information being visually distinguished from broadcast files that do not include additional information according to an embodiment of the present invention.
Figure 3D:
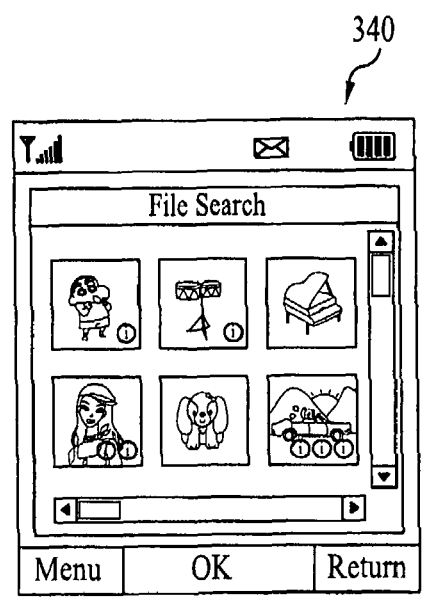
FIG. 3D is a fourth screenshot illustrating broadcast files being distinctly displayed in a thumbnail file list according to an embodiment of the present invention.

In FIG. 3C, the terminal 100 displays a screen 330 having a background color of the file name of each file having an associated network server to be distinguished from a background color of the file name of each file having no associated network server in the file list. For example, the terminal 100 may use a highlight to distinctly display the background color of the file name of each file having an associated network server in the file list. Note that FIG. 3C differs from FIG. 3B, because FIG. 3C doesn't also include an indicator indicating to the user the presence of the associated network server Further, FIG. 3D illustrates the terminal 100 displaying a screen 340 having a representative picture of each stored broadcast file. In addition, the broadcast files that area associated with at least one network server include an indicator indicating to the user the presence of the associated network server(s). In addition, when the broadcast file includes only one image, the representative picture may be the one image. When the broadcast file includes a plurality of images, the representative picture may be the first or a highlighted one of the plurality of images.

Figure 3E:
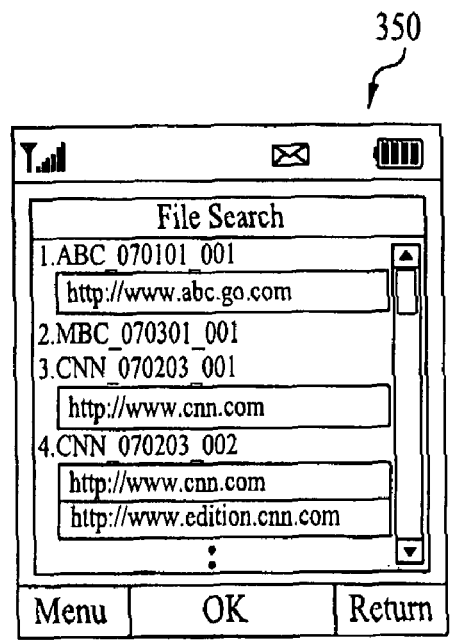
FIG. 3E is a first screenshot illustrating address information of network servers associated with broadcast files being displayed in a file list according to an embodiment of the present invention.
Figure 3F:
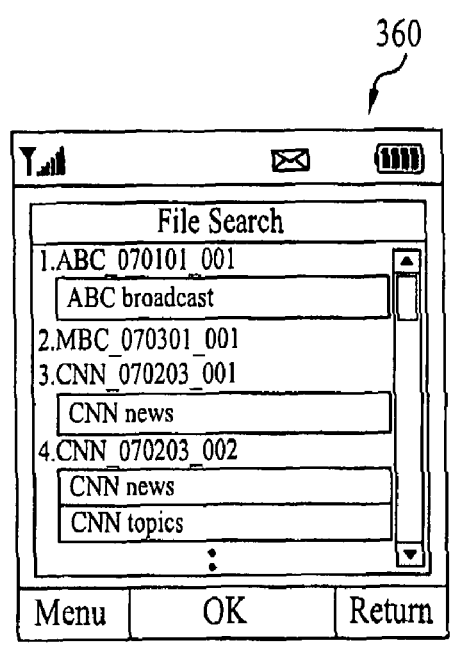
FIG. 3F is a second screenshot illustrating address information of network servers associated with broadcast files being displayed in a file list according to an embodiment of the present invention.
Figure 3G:
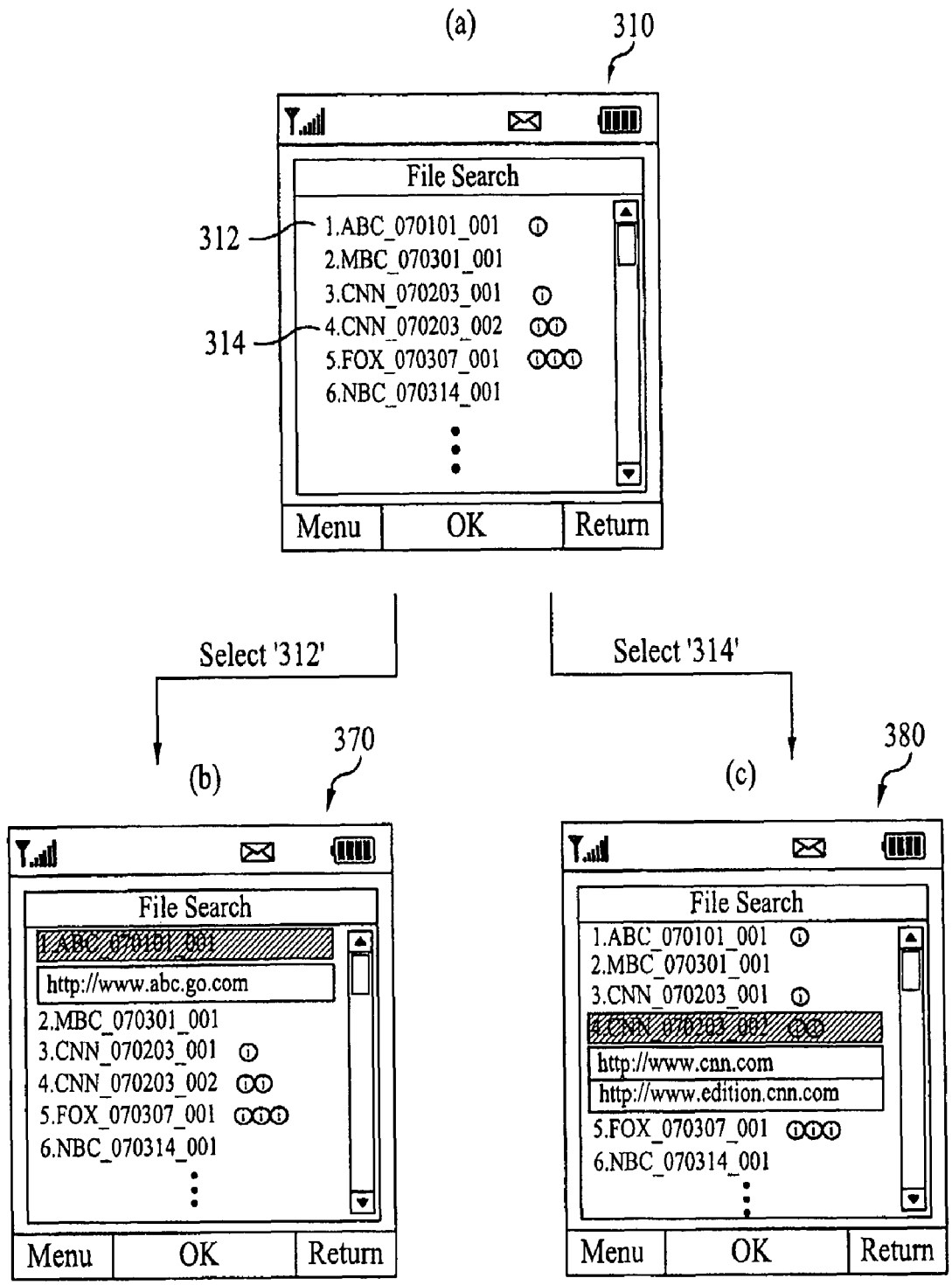
FIG. 3G is a third screenshot illustrating address information of network servers associated with broadcast files being displayed in a file list according to an embodiment of the present invention.

In addition, FIGS. 3E to 3G illustrate the terminal 100 providing address information of a network server associated with each file in the file list. In more detail, as shown in FIG. 3E, for each file having an associated network server in the file list, the terminal 100 displays a screen 350 having the address of the network server associated with the file under its file name. That is, the address of the network server is information indicating the position of the network server on the network such as a URL.

As shown in FIG. 3F, for each file having an associated network server in the file list, the terminal 100 displays a screen 360 having the name of the network server associated with the file under its file name. The name of the network server may be specified by the user of the terminal when or after the file is created and may also be automatically generated.

In FIG. 3G, first, the terminal 100 distinctly displays the screen 310 (also shown in FIG. 3A) having each file having an associated network server in the file list include an indicator (see FIG. 3G(a)). Then, when the "ABC__070101__001" file 312 is selected from the file list, the terminal 100 displays a screen 370 having the address of a network server associated with the selected "ABC__070101__001" file 312 (see FIG. 3G(b)). On the other hand, when the "CNN__070203__002" file 314 is selected from the file list, the terminal 100 displays a screen 380 having the address of a network server associated with the selected "CNN__070203__002" file 314 (see FIG. 3G(c)). The terminal 100 may also display the name of the network server instead of the address.

Figure 3H:
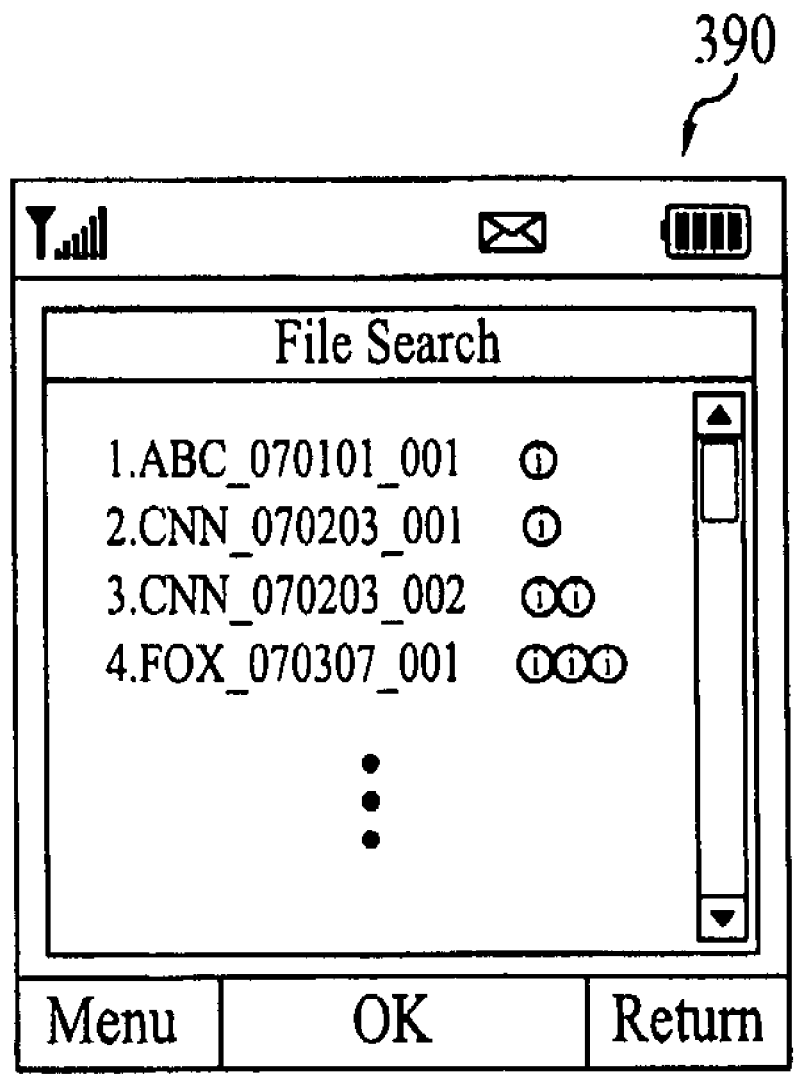
FIG. 3H is a screenshot illustrating a list of only broadcast files that have an associated indicator indicating the broadcast files have additional information according to the present invention.

Further, in FIG. 3H, the terminal 100 displays a screen 390 having a file list including only files that have an associated network server. That is, in FIG. 3H, the terminal 100 extracts at least one file having an associated network server from the broadcast files stored in the terminal 100 and displays a file list including the extracted file(s).

Figure 4A:
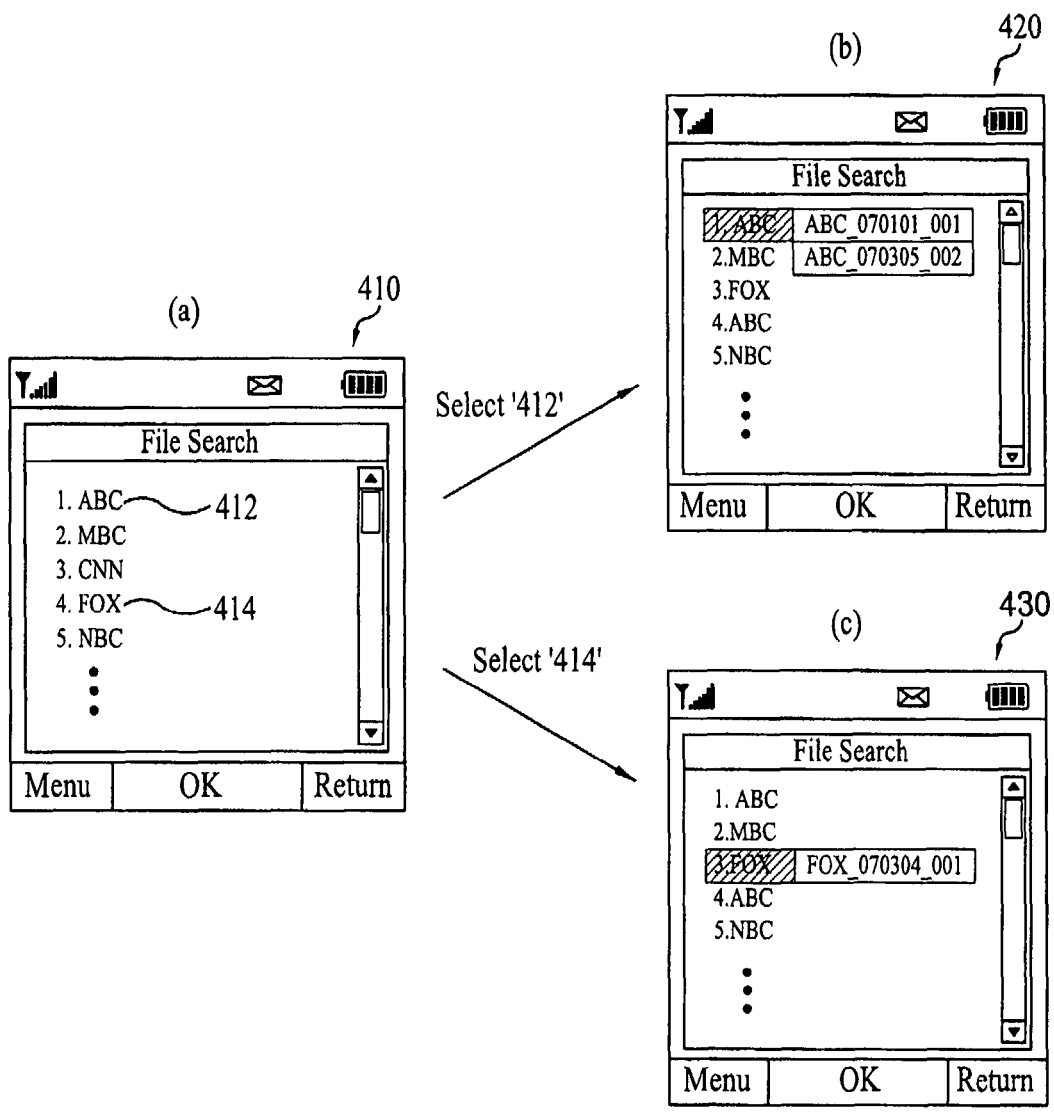
FIG. 4A is a first screenshot illustrating a list of network servers associated with a file according to an embodiment of the present invention.
Figure 4B:
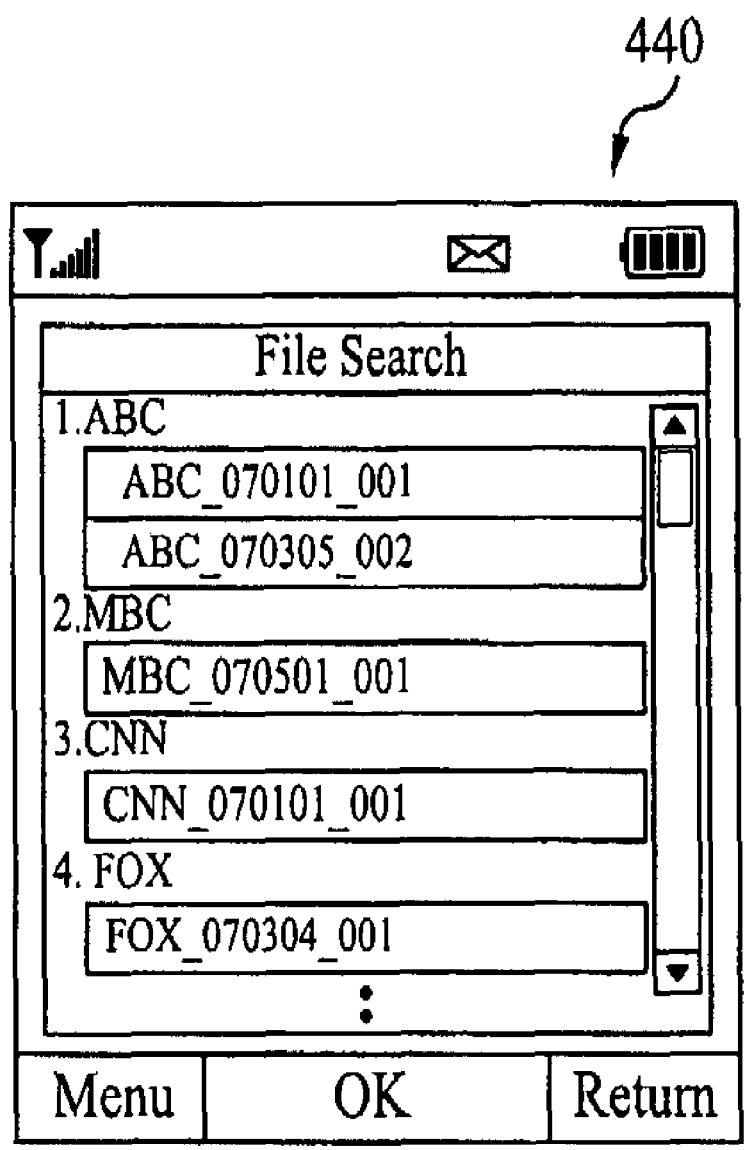
FIG. 4B is a second screenshot illustrating a list of network servers associated with a file according to an embodiment of the present invention.

Next, a procedure for displaying the network server list is described with reference to FIGS. 4A and 4B. In more detail, as shown in FIG. 4A, first, the terminal 100 displays a screen 410 including a network server list. Further, at least one network server included in the network server list is associated with at least one file. Also, at least one network server address or name is displayed in the network server list. The following description is given under the assumption that the name is displayed.

As shown, when the "ABC" network server 412 is selected from the network server list, the terminal 100 displays a screen 420 having at least one file associated with the "ABC" network server 412 (see FIG. 4A(b)). When the "FOX" network server 414 is selected from the network server list, the terminal 100 displays a screen 430 having at least one file associated with the "FOX" network server 414 (see FIG. 4A(c)). Further, in FIG. 4B, the terminal 100 displays a screen 440 having at least one file associated with each network server in the network server list under the name of the network server.

Returning to FIG. 2, the user of the terminal 100 selects one of the at least one file included in the displayed file list (S230). In addition, the user may also select one of the at least one network server included in the displayed network server list. Further, as the terminal 100 is connected to the selected network server, the terminal 100 may output data provided from the connected network server or may output the data provided from the connected network server together with a file associated with the selected network server.

Next, in step S240 of FIG. 2, the terminal 100 determines whether or not at least one network server is associated with the selected file. If terminal 100 determines that at least one network server is associated with the selected file (Yes in S240), the terminal 100 selects at least one of an operation for outputting the selected file and informing the user the file is associated with a network server (S250), and an operation for connecting to a network server associated with the selected file according to selection of the user (S285). When the selected file is not associated with a network server (No in S240), the terminal only outputs the selected file (S295).

Figure 5A:
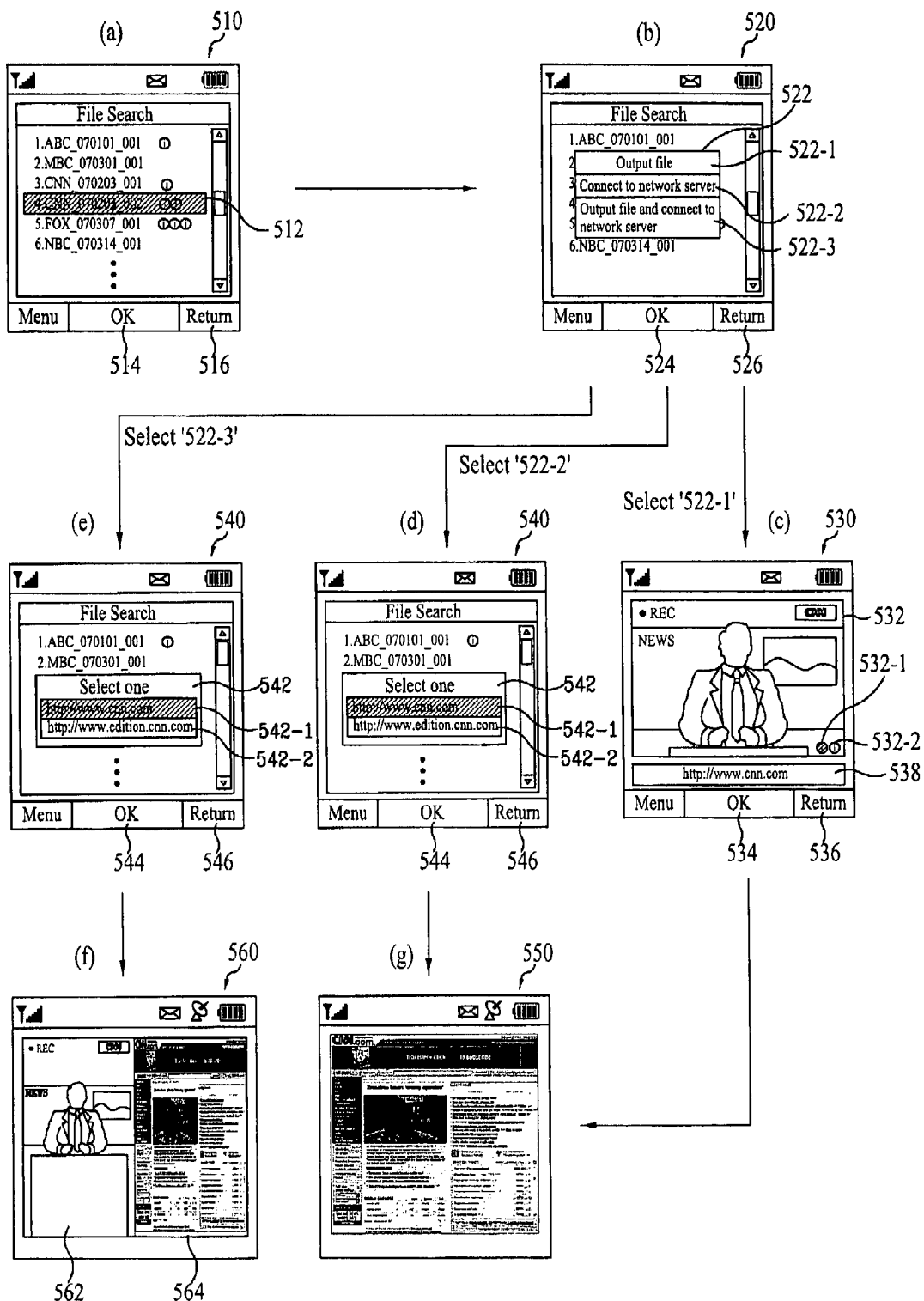
FIG. 5A is a first screenshot diagram illustrating a procedure for connecting to a network server associated with a selected file according to an embodiment of the present invention.

That is, as shown in FIG. 5A, when the "CNN__070203__002" file 512 is selected from a file list displayed on a screen 510 (see FIG. 5A(a)), the terminal 100 displays a window 522 allowing the user to select one of output 522-1 of the selected file, connection 522-2 to a network server associated with the selected file, and connection 522-3 to a network server associated with the selected file while outputting the selected file (see FIG. 5A(b)). Further, the terminal 100 may also perform a default operation among the operations for outputting the selected file and connecting to a network server associated with the selected file.

The following description will be given separately for the case when the output of the selected file is selected, the case when the connection to a network server associated with the selected file is selected, and the case when both the connection to a network server associated with the selected file and the output of the selected file is selected.

In more detail, as shown in step S250 of FIG. 2, when the output of the selected file is selected, the terminal 100 informs the user that at least one network server is associated with the selected file while outputting the selected file.

More specifically, as shown in FIG. 5A, when the output 522-1 of the selected file is selected, the terminal 100 displays a screen 532 for outputting the selected file while displaying indicators 532-1 and 532-2 informing that the user that two network servers are associated with the selected file (see FIG. 5A(c)). The terminal 100 also displays a network server address 538 corresponding to the currently selected indicator 532-1 in a bottom region under the screen 530.

In step S260 in FIG. 2, when connection to one of at least one network server associated with the selected file is selected, the terminal 100 connects to the selected network server (S270). The terminal 100 then outputs data provided from the connected network server (S280) or outputs both the selected broadcast file and the data provided from the connected network server on a single screen (S290) according to a selection of the user.

More specifically, at step S280 in FIG. 2, the terminal 100 stops the file output operation of step S250 and outputs data provided from the connected network server. At step S290, the terminal 100 divides the screen into a plurality of display regions and outputs the selected file on one of the display regions and outputs the data provided from the connected network server on another display region.

In more detail, as shown in FIG. 5B, when any network server associated with the selected file is selected during the output of the displays screen 585 of the selected file (see FIG. 5B(a), the terminal 100 connects to the selected network server while displaying a window 592 prompting the user about whether or not they want to continue outputting the selected file (see the screen 590 in FIG. 5B(b). Further, when an option 592-1 to continue the output (Yes) is selected, the terminal 100 continues outputting the selected file on a first display region on a first display region 582 and outputs data provided from the selected network server on a second display region 584 (see FIG. 5B(d)). On the other hand, when an option 592-2 to stop the output (No) is selected, the terminal 100 outputs the data provided from the selected network server on the screen 595 (see FIG. 5B(c)).

Next, as discussed above in step S270 in FIG. 2, when the connection to a network server associated with the selected file is selected, the terminal 100 connects to a network server selected from at least one network server associated with the selected file. More specifically, as shown in FIG. 5A, when the connection 522-2 to a network server associated with the selected file is selected, the terminal 100 displays a window 542 allowing the user to select of one of the two network servers associated with the selected file (see the window 540 in FIG. 5A(d)). Here, the window 542 displays network server addresses 542-1 and 542-2. The terminal 100 then connects to a network server corresponding to a network server address selected from the network server addresses 542-1 and 542-2 (see FIG. 5A(g)).

Further, as discussed above with respect to steps S280 and S290 of FIG. 2, the terminal 100 then outputs data provided from the connected network server (S280) or outputs both the selected file and the data provided from the connected network server on the single screen according to selection of the user (S290).

In more detail, as shown in FIG. 5B, when any network server associated with the selected file is selected, the terminal 100 connects to the selected network server while displaying a window 576 asking the user whether or not to output the selected file (see the screen 575 in FIG. 5B(e))). When an option 576-1 to output the file (Yes) is selected, the terminal 100 outputs the selected file on the first display region 582 on the screen and outputs data provided from the selected network server on the second display region 584 (see the screen 580 in FIG. 5B(d)). On the other hand, when an option 576-2 not to output the selected file (No) is selected, the terminal 100 outputs the data provided from the selected network server on the screen 595 in FIG. 5B(c).

Next, when the connection to a network server associated with the selected file while outputting the selected file is selected, the terminal 100 connects to a network server selected from at least one network server associated with the selected file while outputting the selected file (as discussed in step S285 of FIG. 2).

More specifically, as shown in FIG. 5A, when the connection 522-3 to a network server associated with the selected file while outputting the selected file is selected, the terminal 100 displays the window 542 allowing the user to select of one of the two network servers associated with the selected file (see the screen 540 in FIG. 5A(e)). The terminal 100 then connects to a network server corresponding to a network server address selected from the network server addresses 542-1 and 542-2 displayed on the window 542.

Further, in step S290 of FIG. 2, the terminal 100 outputs both the selected file and the data provided from the connected network server on the single screen (S290). In this instance, the terminal 100 divides the screen into a plurality of display regions and outputs the selected file on one of the display regions and outputs the data provided from the connected network server on another display region.

More specifically, as shown in FIG. 5A, the terminal 100 outputs the selected file on a first display region 562 on the screen 560 and outputs data provided from the selected network server on a second display region 564 (see FIG. 5A(f)).

In addition, FIG. 5B(f) illustrates the screen 510 including a list of broadcast files (shown also in FIG. 5A(a)). Then, when the user selects an OK button 514, the terminal 100 displays a screen 570 as shown in FIG. 5B(g). The user can then select a return button 516 to return to the screen 510, or select the OK button 514 in the screen 570 to proceed to the screen 575 shown in FIG. 5B(e). Alternatively, if the user selects the file 512 in the screen 510 shown in FIG. 5B(f), the terminal 100 displays the selected file as shown in the screen 585 in FIG. 5B(a).

Figure 6A:
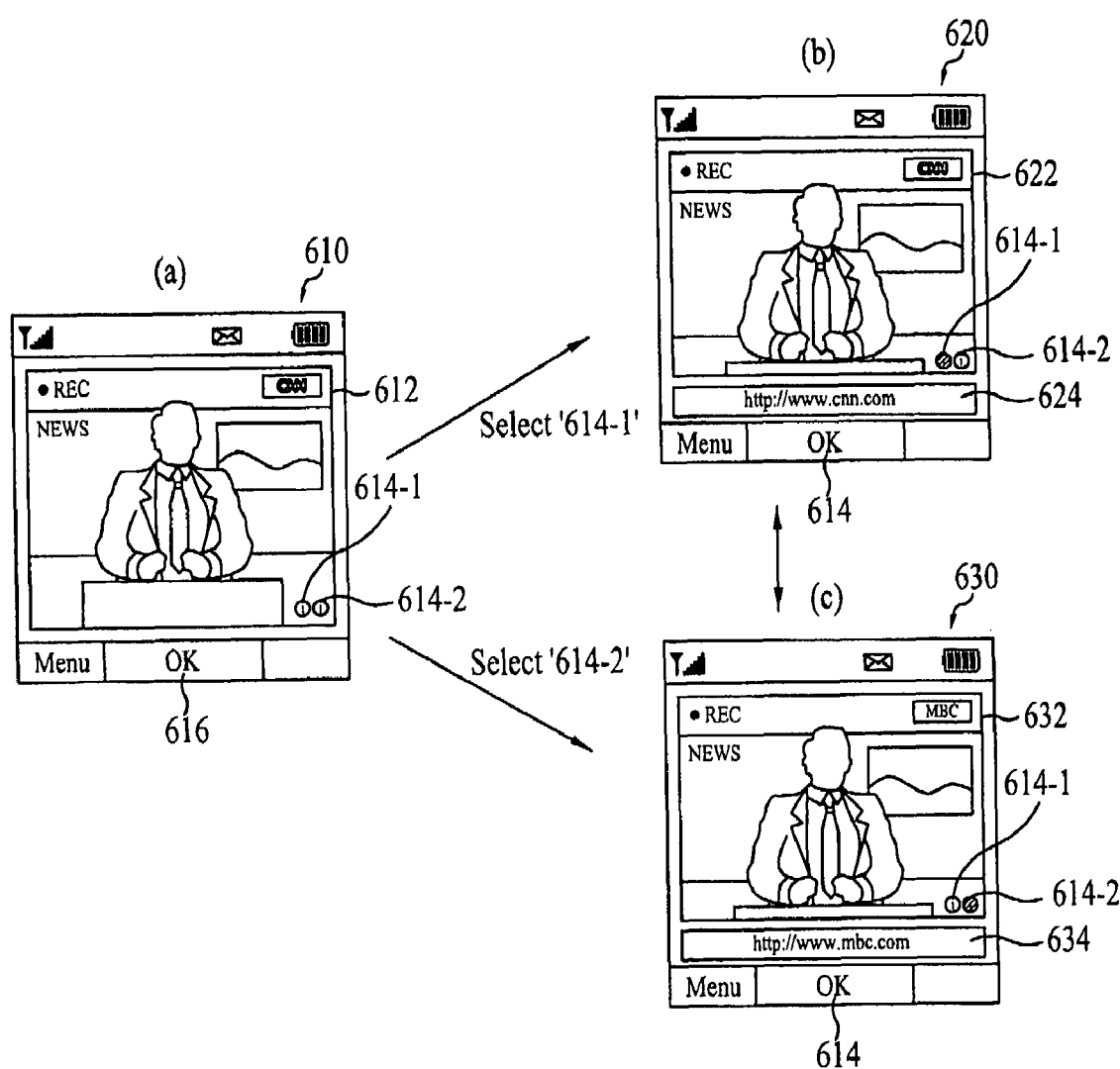
FIG. 6A is a first screenshot illustrating information of a network server associated with a selected file during output of the selected file according to an embodiment of the present invention.

A procedure for providing information of a network server associated with a selected file during output of the selected file will now be described with reference to FIGS. 6A to 6D. In the case of FIG. 6A, the terminal 100 displays a screen 610 including the same number of indicators 614-1 and 614-2 as the number of network servers associated with the selected file in a region on an output display area 612 of the 610 (see FIG. 6A(a)).

When the first indicator 614-1 is selected in the state 610, the terminal 100 displays a screen 620 including a network server address 624 corresponding to the first indicator 614-1 in a bottom region of the screen 620 (see FIG. 6A(b)). When the second indicator 614-2 is selected on the screens 610 or 620, the terminal 100 displays a screen 630 including a network server address 634 corresponding to the second indicator 614-2 in the bottom region of the screen 630 (see FIG. 6A(c)).

Figure 6B:
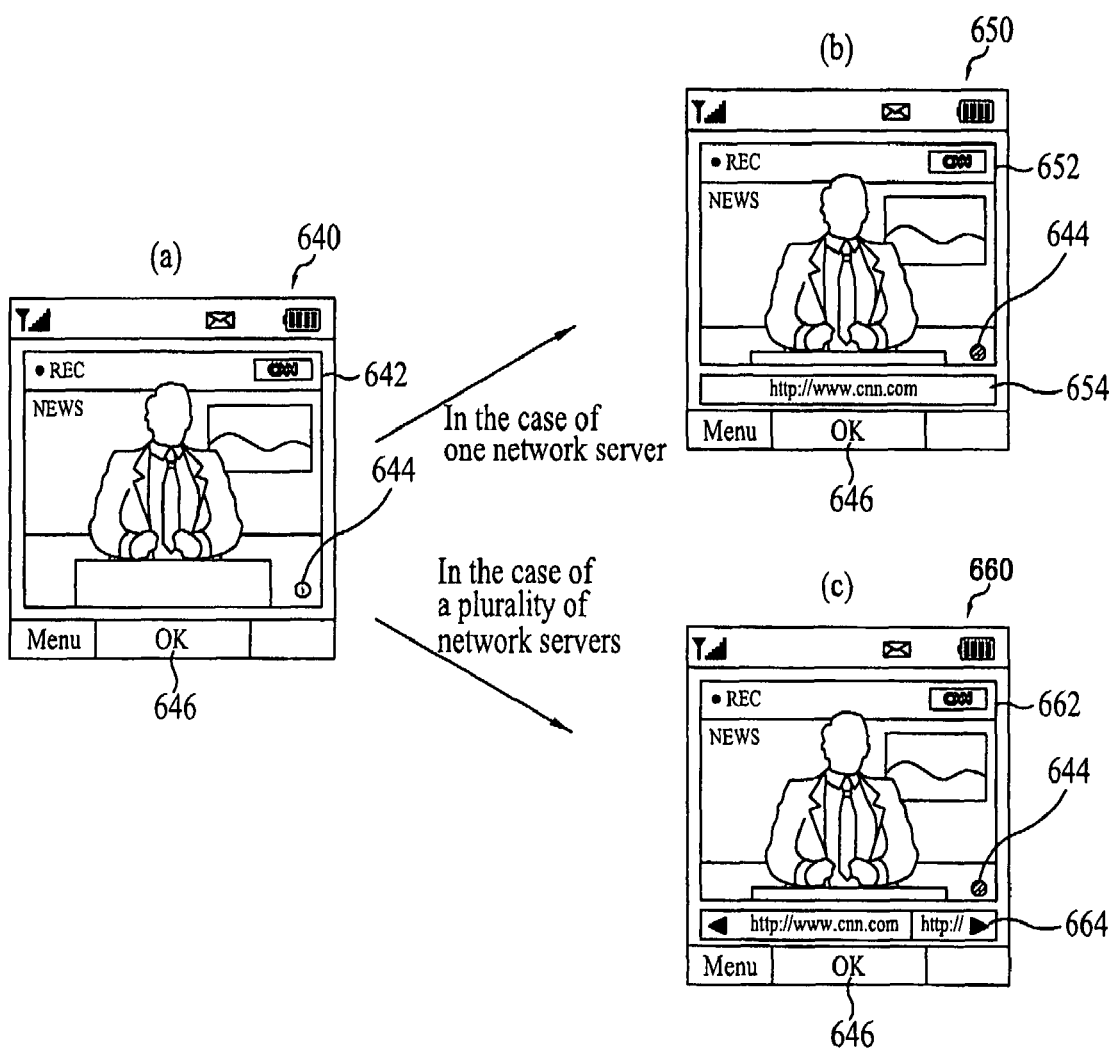
FIG. 6B is a second screenshot illustrating information of a network server associated with a selected file during output of the selected file according to an embodiment of the present invention.

In more detail, as shown in FIG. 6B, the terminal 100 displays a screen 640 including an indicator 644 informing the user that a network server is associated with the selected file in a region on an output display area 642 of the screen 640 (see FIG. 6B(a)). In this example, the terminal 100 displays only one indicator regardless of the number of network servers associated with the selected file.

In addition, if the indicator 644 is activated and one network server is associated with the selected file, the terminal 100 displays a screen 650 including a network server address 654 associated with the selected file in a bottom region of the screen 650 (see FIG. 6B(b)). On the other hand, when the indicator 644 is activated and a plurality of network servers are associated with the selected file, the terminal 100 displays a screen 660 including the plurality of network server addresses 664 associated with the selected file in the bottom region under the screen (see FIG. 6B(c). The network server addresses may be provided in the form of a ticker bar or may be moved and displayed one at a time at regular intervals.

Figure 6C:
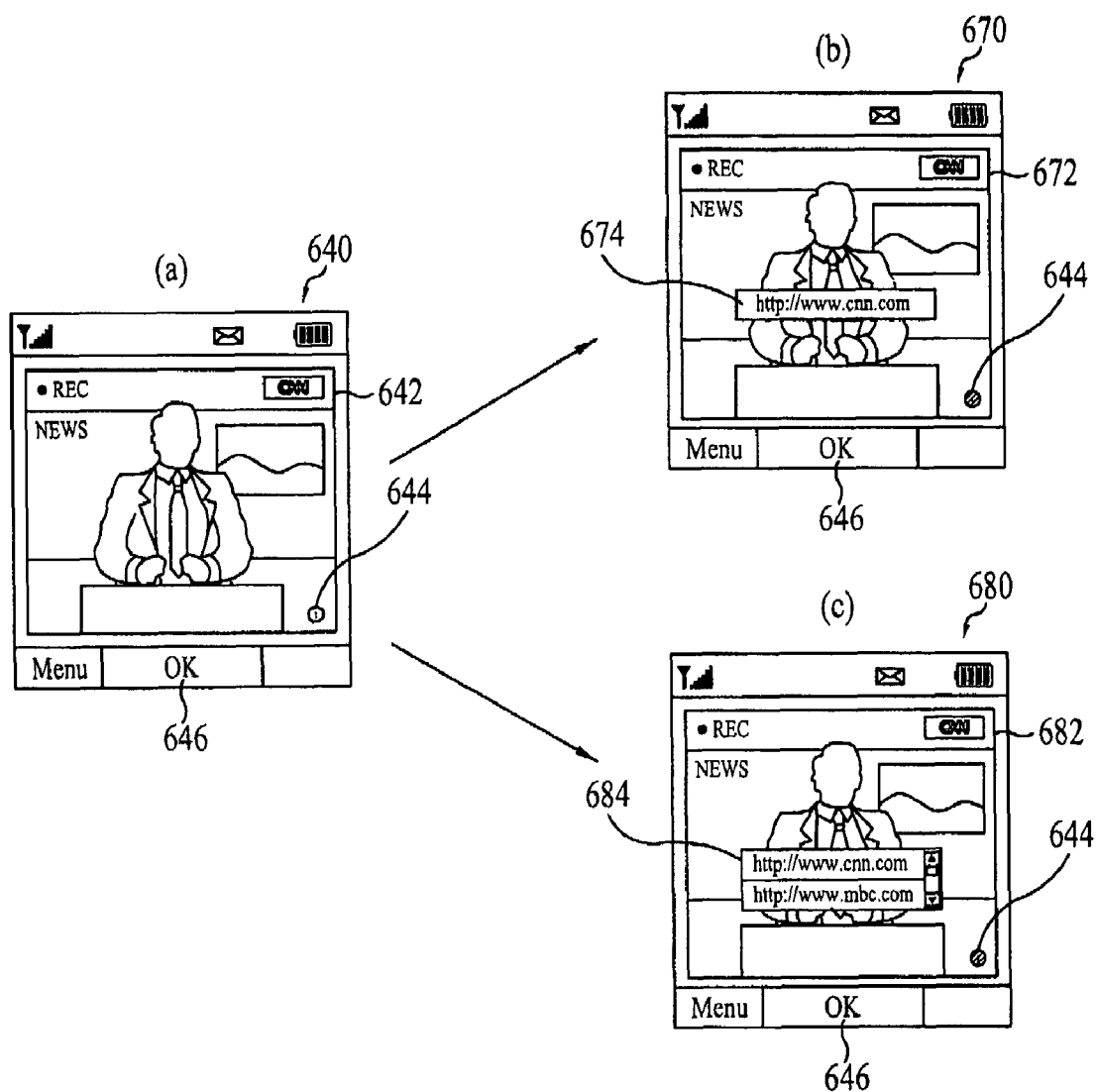
FIG. 6C is a third screenshot illustrating information of a network server associated with a selected file during output of the selected file according to an embodiment of the present invention.

In addition, in FIG. 6C, when the indicator 644 is activated in the screen 640 (see FIG. 6C(a)), the terminal 100 provides a list 674 or 684 of network server addresses associated with the selected file in a pop-up or Picture In Picture (PIP) format (see the screens 670 and 680 in FIGS. 6C(b) and 6C(c)).

Figure 6D:
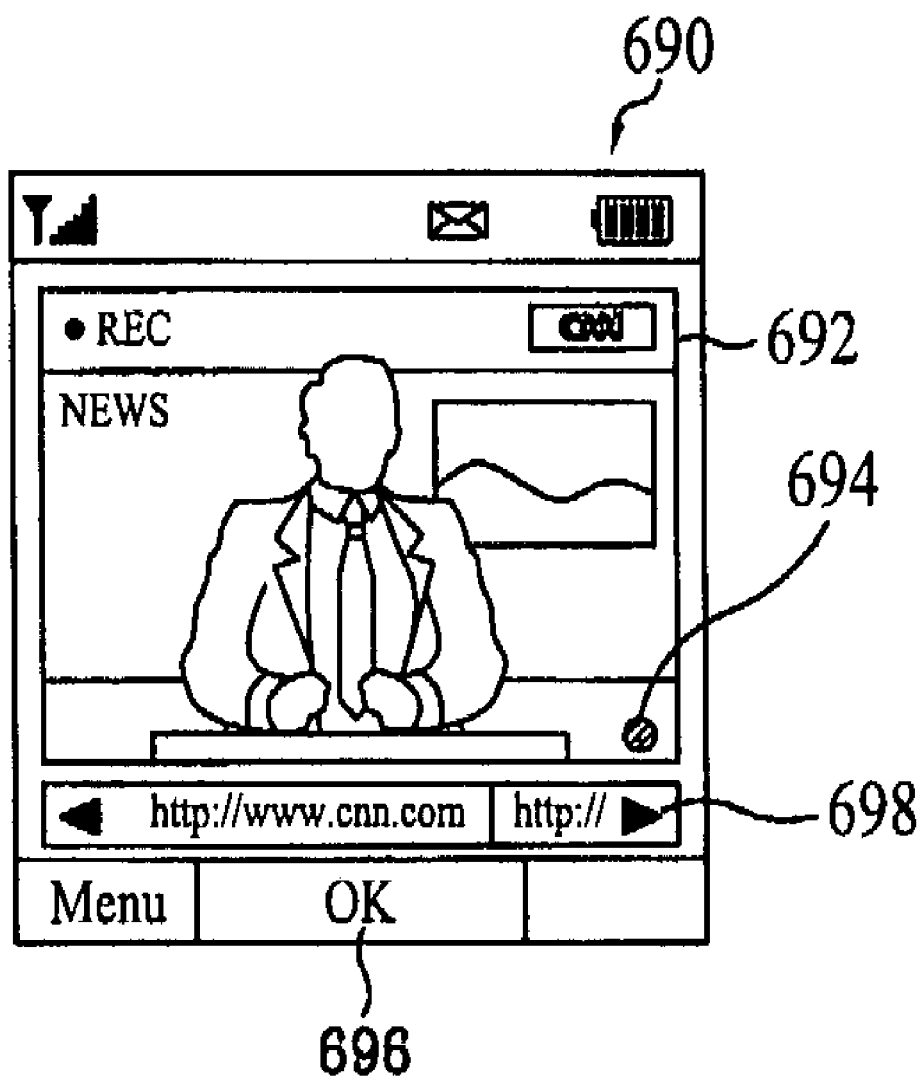
FIG. 6D is a fourth screenshot illustrating information of a network server associated with a selected file during output of the selected file according to an embodiment of the present invention.

Further, in FIG. 6D, when the terminal 100 has been set by default to output the selected file while providing a network server address, the terminal 100 displays a screen 690 including the output selected file in a display window 692 while providing at least one network server address 698 associated with the selected file in a bottom region of the screen 690.

Figure 7:
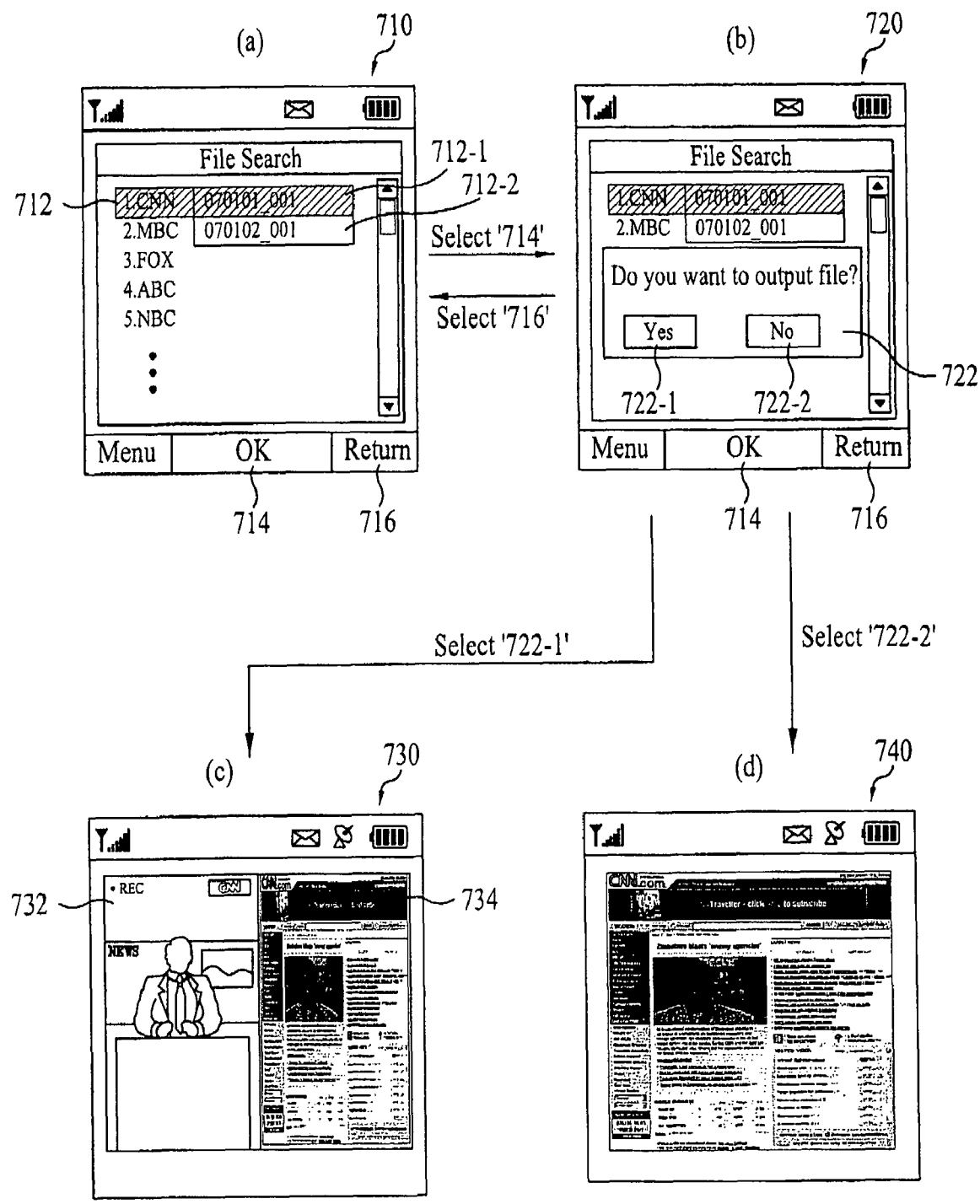
FIG. 7 is a screenshot diagram illustrating a procedure for outputting a screen in response to selection of a network server using a network server list according to an embodiment of the present invention.

A procedure for outputting a screen as a network server is selected using a network server list according to the present invention will now be described with reference to FIG. 7.

In more detail, when the network server name "CNN" 712 is selected from the network server list, the terminal 100 displays a screen 710 including files 712-1 and 712-2 associated with a network server corresponding to the server name "CNN" 712 (see FIG. 7(a)). When one of the files 712-1 and 712-2 is selected and an "OK" button 714 is selected, the terminal 100 connects to a network server corresponding to the server name "CNN" 712 while displaying a window 722 to ask whether or not the user wants to output the selected file 712-1 (see the screen 720 in FIG. 7(b)). The user can also select a return button 716 to return to the screen 710 in FIG. 7(a).

When an option 722-1 to output the file (Yes) is selected, the terminal 100 outputs the selected file 712-1 on a first display region 732 and outputs data provided from the network server corresponding to the server name "CNN" 712 on a second display region 734 (see the screen 730 in FIG. 7(c)).

When an option 722-2 not to output the file (No) is selected, the terminal 100 outputs the data provided from the network server corresponding to the server name "CNN" 712 (see the screen 740 in FIG. 7(d)).

A procedure for storing information using a broadcast according to the present invention will now be described with reference to the flowchart in FIG. 8.

As shown, the terminal 100 receives a broadcast program through a broadcast channel (S805). The broadcast includes at least one of a radio broadcast, a TV broadcast, and a data broadcast. Then, the terminal 100 generates a signal for storing information of a network server or a phone number associated with the received broadcast according to selection of the user (S810).

In addition, the information of the phone number includes any entity such as the phone number, a person or company name corresponding to the phone number, services that can be provided when a connection to the phone number has been established, etc. Similarly, the information of the network server includes any entity such as address information of the network server, a name of the network server, services that can be provided when a connection to the network server has been established, etc.

In addition, the information of the phone number or the network server may be included in data that constitutes the broadcast, in data that is associated with the broadcast, and in data that is provided in conjunction with the broadcast. Each of the data provided in the various forms includes a separate field for carrying the phone number or the network server address information. Further, the data associated with the broadcast may be from the EPG or ESG, for example. The data provided in conjunction with the broadcast program may be included in the Program Associated Data (PAD) or Binary Format for Scenes (BIFS) data.

Then, in FIG. 8, the terminal 100 determines whether or not there is network server or phone number information associated with the received broadcast (S815). If the terminal 100 determines that there is such information (Yes in S815), the terminal 100 determines whether or not to the user wants to store the received broadcast according to selection of the user (S820).

If the user selects to store the received broadcast (Yes in S820), the terminal 100 stores information of at least one phone number associated with the received broadcast while storing the received broadcast (S825). Alternatively, the terminal 100 stores information of at least one network server associated with the received broadcast while storing the received broadcast (S830).

On the other hand, if the user selects not to store the received broadcast (No in step S820), the terminal 100 stores information of at least one phone number associated with the received broadcast (S835) and information of at least one network server associated with the received broadcast (S840).

In addition, in the steps S825 and S835, the terminal 100 may also store information of a phone number selected by the user from among information of at least one phone number associated with the received broadcast. Further, in the steps S825 and S835, the terminal 100 may also allow the user to specify and input a respective name of the information of the at least one phone number associated with the received broadcast.

Also, in the steps S830 and S840, the terminal 100 may also store information of a network server selected by the user from among information of at least one network server associated with the received broadcast. In addition, in the steps S830 and S840, the terminal 100 may also allow the user to specify and input a respective name of the information of the at least one network server associated with the received broadcast.

Further, in each of the steps S825, S830, S835 and S840, the terminal 100 may also store information of a network server or a phone number associated with a broadcast received during a period from a predetermined time ago, compared to the moment when the storage step is performed.

Then, in step S845, the terminal 100 connects a call using one of the at least one phone number stored at step S825 and S835 according to a selection by the user. The terminal 100 also connects to a network server using one of the at least network server information stored at step S830 and S840 according to a selection by the user (S850).

On the other hand, if the terminal 100 determines there is no associated network server or phone number information (No in S815), the terminal 100 determines whether or not the user wants to store the received broadcast according to a selection by the user (S855). The, if the received broadcast is to be stored (Yes in S855), the terminal 100 stores the received broadcast. Alternatively (No in S855), the terminal 100 does not store the received broadcast program.

As is apparent from the above description, the present invention provides a variety of advantages.

For example, first, according to an embodiment of the present invention, it is possible to store both a broadcast program having an associated network server and address information of the associated network server. Therefore, the user can connect to the associated network server in response to selection of a file storing the broadcast program.

Second, it is possible to store network server address information associated with a broadcast. Therefore, the user can to connect to a desired network server using the stored network server address information.

Third, it is possible to store a phone number associated with a broadcast. Therefore, the user can connect to a call to the stored phone number.

Fourth, it is possible to output data provided from a connected network server while outputting a file storing a broadcast associated with the network server.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A broadcasting mobile terminal communication method, the method comprising:
    storing, in a broadcasting mobile terminal, at least one broadcast file and specific entity connection data with which each of the at least one broadcast file is associated;
    entering a file search mode for searching for the at least one broadcast file stored in the broadcasting mobile terminal;
    displaying a list of broadcast files stored on the broadcasting mobile terminal, the at least one of the broadcast files being associated with entity connection data stored on the broadcasting mobile terminal, said entity connection data allowing a user to obtain additional information about the at least one broadcast file;
    displaying, along with the list of broadcast files, at least one entity connection data indicator to indicate to the user that the at least one broadcast file is associated with the entity connection data, wherein if more than one indicator is displayed, a number of indicators associated with each broadcast file is equal to a number of the entity connection data associated with each broadcast file;
    selecting a broadcast file from the list of broadcast files;
    connecting to an entity that provides the additional information about the selected broadcast file using the specific entity connection data;
    receiving the additional information about the selected broadcast file from the connected entity; and
    displaying simultaneously or selectively the selected broadcast file and the additional information about the selected broadcast file.

2. The method of claim 1, wherein the entity connection data indicator comprises at least one icon.

3. The method of claim 2, wherein the at least one icon comprises a plurality of icons corresponding to a plurality of entity connection data, respectively.

4. The method of claim 3, wherein the selecting step comprises:
    selecting one of the plurality of icons; and
    displaying an entity address, an entity name, or an entity telephone number corresponding to the entity that provides the additional information about the at least one broadcast file, and
    wherein the connecting step connects to the entity using the entity address, the entity name or the entity telephone number.

5. The method of claim 2, wherein the selecting step comprises:
    selecting the displayed icon;
    displaying an entity address, an entity name, or an entity telephone number corresponding to the entity that provides the additional information about the at least one broadcast file; and
    displaying a scroll indicator when there are a plurality of entity addresses, entity names or entity telephone numbers.

6. The method of claim 1, wherein the displaying the list of broadcast files step comprises:
    highlighting the at least one of the broadcast file being associated with the entity connection data to distinguish the at least one broadcast file associated with the entity connection data from a broadcast file that is not associated with the entity connection data.

7. The method of claim 1, wherein the displaying the list of broadcast files step comprises:
    displaying only broadcast files that are associated with the entity connection data.

8. The method of claim 1, wherein the displaying at least one entity connection data indicator step displays the list of broadcast files stored on the broadcasting mobile terminal as representative images.

9. The method of claim 8, wherein the displaying at least one entity connection data indicator step displays the entity connection data indicator on the representative image.

10. The method of claim 1, further comprising:
    displaying an entity address, an entity name, or an entity telephone number corresponding to the entity that provides the additional information about the at least one broadcast file under the at least one broadcast file.

11. The method of claim 10, wherein displaying the entity address, the entity name, or the entity telephone number only displays the entity address, the entity name, or the entity telephone number when the user selects the at least one broadcast file being associated with the specific entity connection data.

12. The method of claim 1, further comprising:
    displaying a pop up menu including at least one option of outputting the selected broadcast file, connecting to the entity that provides the additional information, and outputting the selected broadcast file and connecting to the entity that provides the additional information.

13. A broadcasting mobile terminal communication method, the method comprising:
    storing, in a broadcasting mobile terminal, a broadcast file and specific entity connection data with which the broadcast file is associated;
    entering a file search mode for searching for the stored broadcast file;
    displaying a list of entity connection data stored on the broadcasting mobile terminal, said entity connection data allowing a user to obtain additional information about the stored broadcast file, the broadcast file corresponding to the entity connection data;

displaying the entity connection data as an indicator to indicate to the user that the broadcast file is associated with the entity connection data, wherein if more than one indicator is displayed, a number of indicators associated with each broadcast file is equal to a number of the entity connection data associated with each broadcast file;

selecting the specific entity connection data from the list of entity connection data;

connecting to an entity that provides the additional information about the corresponding broadcast file using the selected entity connection;

receiving the additional information about the corresponding broadcast file from the connected entity; and displaying simultaneously or selectively the corresponding broadcast file and the additional information about the corresponding broadcast file.

14. The method of claim 13, wherein the corresponding broadcast file is also stored on an external broadcasting server.

15. The method of claim 13, further comprising:
displaying an entity address, an entity name, or an entity telephone number corresponding to the entity that provides the additional information about the at least one broadcast file.

16. The method of claim 13, wherein the entity connection data indicator comprises at least one icon.

17. The method of claim 13, further comprising:
selectively changing, by the user, a name of the displayed entity connection data.

18. A broadcasting mobile terminal communication method, the method comprising:
receiving a broadcast program and entity connection data, said entity connection data allowing a user to obtain information about the received broadcast program;

receiving a user request to store the received broadcast program and the entity connection data before entering a file search mode;

storing the received entity connection data on the broadcasting mobile terminal, wherein an indicator indicating to the user that a broadcast file is associated with the entity connection data is included in the broadcast file, and if more than one entity connection data is received, a number of indicators associated with each broadcast file is equal to a number of the entity connection data associated with each broadcast file;

connecting to an entity that provides the information about the broadcast program using the stored entity connection data; and receiving the information about the broadcast file from the connected entity.

19. The method of claim 18, wherein the storing step stores the received entity connection data with the received broadcast program.

20. The method of claim 19, wherein the entity connection data comprises one of an entity address, an entity name, or an entity telephone number corresponding to the entity that provides the additional information about the received broadcast program.

21. The method of claim 19, wherein the entity connection data is included in the received broadcast program or is received separately from the received broadcast program.

22. A broadcasting mobile terminal, comprising:
a display unit configured to display a list of broadcast files stored on the broadcasting mobile terminal and to display, along with the list of broadcast files, at least one entity connection data indicator, at least one of the broadcast files being associated with entity connection data stored on the broadcasting mobile terminal, said entity connection data allowing a user to obtain additional information about the at least one broadcast file, wherein the at least one entity connection data indicator indicates to the user that the at least one broadcast file is associated with the entity connection data, and if more than one indicator is displayed, a number of indicators associated with each broadcast file is equal to a number of the entity connection data associated with each broadcast file;

an input unit configured to allow the user to select a broadcast file that is associated with specific entity connection data; and a control unit configured to store at least one broadcast file and the specific entity connection data with which each of the at least one broadcast file is associated, to enter a file search mode for searching for the at least one broadcast file stored in the broadcasting mobile terminal, to display simultaneously or selectively the selected broadcast file and the additional information about the selected broadcast file, connect to an entity that provides the additional information about the selected broadcast file using the specific entity connection data, and to receive the additional information about the selected broadcast file from the connected entity.

23. A broadcasting mobile terminal, comprising:
a broadcast receiver configured to receive a broadcast program and entity connection data, said broadcasting related data allowing a user to obtain information about the received broadcast program;

an input unit configured to receive a user request to store the received broadcast program and the entity connection data;

a memory unit configured to store the received broadcast program and the entity connection data on the terminal before entering a file search mode, wherein an indicator indicating to the user that a broadcast file is associated with specific entity connection data is included in the broadcast file, and if more than one broadcasting related data is received, a number of indicators associated with each broadcast file is equal to a number of the entity connection data associated with each broadcast file; and a controller configured to connect to an entity that provides the information about the broadcast program using the stored entity connection data, and to receive the information about the broadcast file from the connected entity.

* * * * *